United States Patent
Hoffmeister et al.

(10) Patent No.: US 10,530,251 B1
(45) Date of Patent: Jan. 7, 2020

(54) DC-DC CONVERTER WITH REGULATOR HAVING A PLURALITY OF PARAMETER SETS

(71) Applicant: Robert Bosch GmbH, Stuttgart (DE)

(72) Inventors: Fabian Hoffmeister, Schoenau (DE); Josef Plager, Bogen (DE); Thomas Stein, Wald (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/202,377

(22) Filed: Nov. 28, 2018

(51) Int. Cl.
*H02M 3/157* (2006.01)
*H02M 1/42* (2007.01)
*H02M 1/00* (2006.01)

(52) U.S. Cl.
CPC ......... *H02M 3/157* (2013.01); *H02M 1/4225* (2013.01); *H02M 2001/0009* (2013.01); *H02M 2001/0025* (2013.01)

(58) Field of Classification Search
CPC .... H02M 3/156–3/158; H02M 3/1584; H02M 3/1588; H02M 1/32; H02M 1/42; H02M 1/4208; H02M 1/4225; H02M 2001/0009; H02M 2001/0025; H02M 2001/0032; H02J 7/02; H02J 7/12; G05F 1/33; G05F 1/34; G05F 1/38; Y02B 70/126; B60L 3/00; B60L 11/18
USPC .................................................. 323/282–286
See application file for complete search history.

(56) References Cited

U.S. PATENT DOCUMENTS

| | | | | |
|---|---|---|---|---|
| 8,723,438 | B2 * | 5/2014 | Melanson | H02M 1/4225 315/209 R |
| 9,178,415 | B1 * | 11/2015 | Kost | H02M 3/157 |
| 9,197,132 | B2 * | 11/2015 | Artusi | H02M 1/4225 |

FOREIGN PATENT DOCUMENTS

DE          10348265          5/2005

* cited by examiner

*Primary Examiner* — Yemane Mehari
(74) *Attorney, Agent, or Firm* — Michael Best & Friedrich LLP

(57) ABSTRACT

Converter for the converting a DC input voltage into a DC output voltage, having at least one inductance and capacitance, which are interconnected in a power-conducting path, wherein a current inductance value of the inductance depends on a current value of a current flowing through the coil, having a regulator for regulating the DC output voltage to a setpoint, wherein the regulator comprises a parameter set that determines its regulation behavior, having a measurement module for determining at least one characteristic value of at least one characteristic parameter of the converter, and the converter contains a plurality of interchangeable parameter sets for the regulator, wherein each one of the parameter sets in the regulator can be activated, and having a control module for exchanging and activating each of the parameter sets in the regulator as a function of at least one of the characteristic values.

11 Claims, 1 Drawing Sheet

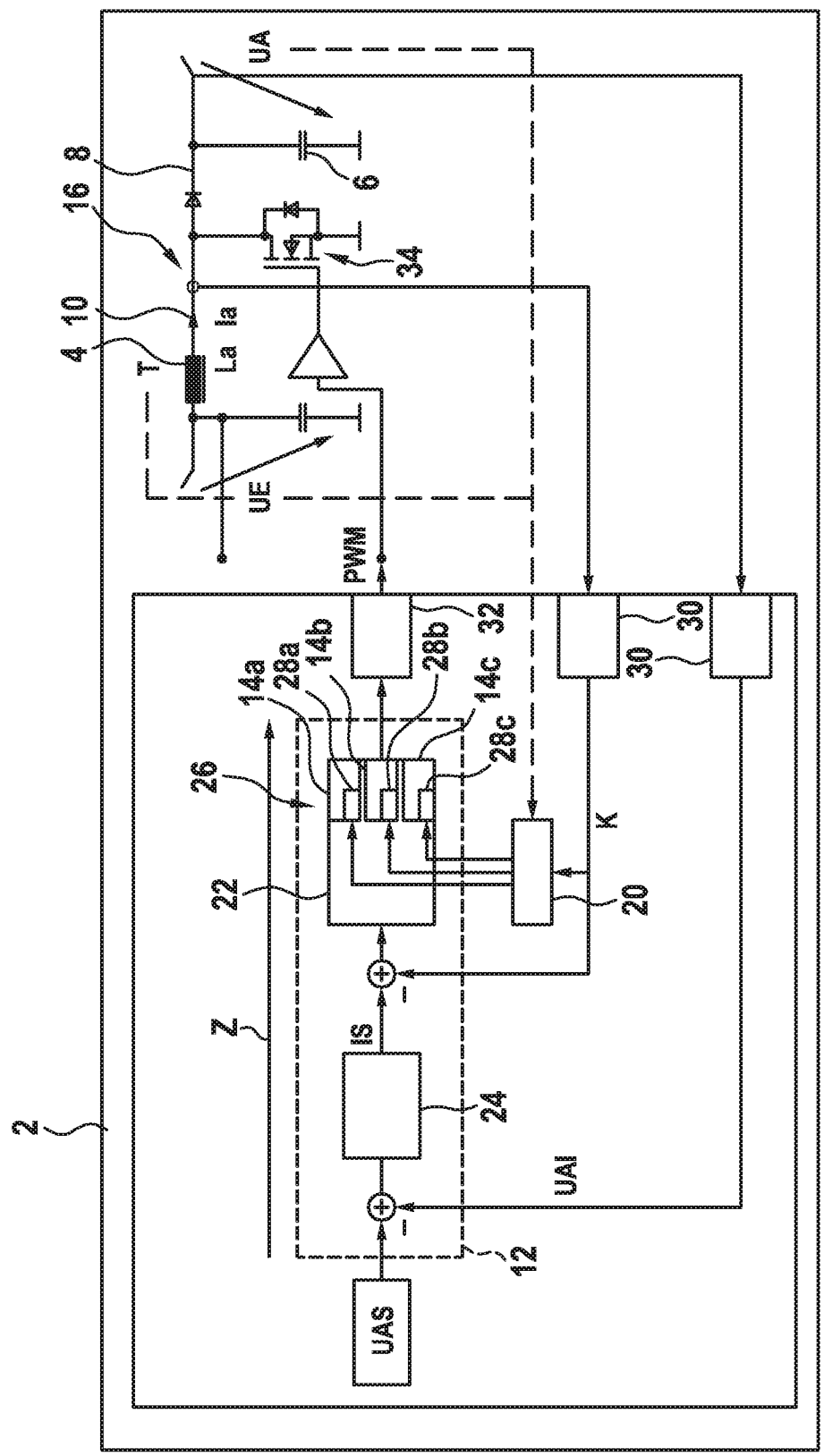

DC-DC CONVERTER WITH REGULATOR HAVING A PLURALITY OF PARAMETER SETS

BACKGROUND OF THE INVENTION

Due to their high power density and higher efficiency compared to analogue longitudinally regulated solutions, DC-DC converters are now widely used. In highly simplified terms, such a system can be described by the fact that a high-frequency alternating voltage is generated using a semiconductor switching element and this voltage is converted back into a DC voltage using a higher-order filter. This output voltage is detected and regulated to a target value by means of a control system.

An example of a DC-DC converter is a boost converter. Using this it is possible to convert a DC input voltage into a higher output voltage. The ratio of input to output voltage is essentially defined by the duty cycle of the PWM signal (pulse width modulation) at the switching element, for example a transistor.

A DC-DC converter in the form of a step-up converter is known from DE 103 48 265 A1. The step-up converter comprises a regulating device for stepping-up an input voltage to a desired target voltage level for an output voltage. During the step-up process the regulating device performs a target/actual value comparison between the desired target voltage level for the output voltage and its current actual value.

SUMMARY OF THE INVENTION

In the context of the invention a converter for converting a DC input voltage into a DC output voltage is proposed. Preferred or advantageous embodiments of the invention as well as other categories of the invention are obtained from the claims, the following description and the attached figures. The voltage of the DC input voltage is preferably almost constant over time. Preferably, the DC input voltage is a DC voltage which has been generated from a sinusoidal alternating voltage by rectification and subsequent smoothing, in such a way that the voltage is nearly constant over time. Alternatively, the DC input voltage is a pulsed DC voltage, which was generated from a sinusoidal alternating voltage by rectification, for example by means of a bridge circuit, with no or with only minor subsequent smoothing.

The converter contains at least one inductance, in particular a coil, and preferably at least one capacitance, in particular a capacitor. The inductance and the optional capacitance are interconnected in a power-conducting path. A current inductance value of the inductance is dependent on a current value of a current flowing through the coil.

The converter contains a regulator for regulating the DC output voltage to a target value. The regulator contains a set of parameters for determining its regulation behavior. The converter contains a measuring module for determining at least one characteristic value of at least one characteristic parameter of the converter.

The converter contains a plurality of interchangeable parameter sets for the regulator. Each respective parameter set can be or is activated in the regulator during operation. The converter contains a control module for exchanging and activating each of the parameter sets in the regulator. Exchange and activation are carried out according to at least one of the characteristic parameters or the different respective characteristic values of the corresponding parameter.

An "inductance" in this sense can also be designated in a wider sense as a "coil"—a simplified term for all wound products or components with inductive properties. These include, for example, coils in the true sense of the word, chokes, transformers, etc. The same applies mutatis mutandis to the term "capacitance", which can also be referred to as a "condenser", which stands for capacitive components, in particular capacitors in the true sense of the word.

The invention is based on the following observations: in a standard DC-DC converter, in order to maintain the output voltage at a constant value this is measured, compared with a target value and passed through a regulating system (regulator), which in turn corrects the duty cycle (PWM in the switching element) accordingly. The design of this regulating system determines the operational behavior and safety of the converter. If the regulating system is designed too conservatively, this is expressed, among other things, in poor control behavior in the event of sudden load variations. If, on the other hand, it is set too aggressively, at some operating points this can result in oscillation of the regulator. In this case, the output voltage can deviate strongly from the target value or it may even result in the destruction of the converter.

The invention offers the facility to import different parameter sets into the regulator for different operating states of the regulator and to activate one of them there at a time, so that in the activated state the regulator behaves or regulates based on the current parameter set. The operating state can be detected by the corresponding characteristic value of the characteristic parameter. The control module selects the appropriate parameter set depending on the current characteristic value.

This results in a converter which also exhibits improved regulation under changing operating conditions.

In a preferred embodiment the characteristic value is a current value of the characteristic parameter. "Current" means that this exists or is valid at the same time as the current value of the current and the current inductance. This means that a real-time adjustment of the regulator can be made in the converter by a rapid response to the current characteristic value, in order to respond in particular to the current value of the current and the current inductance.

In a preferred embodiment the characteristic parameter is the amplitude of the current through the inductance, and/or the DC input voltage of the converter and/or the DC output voltage of the converter and/or a temperature at or in the converter, in particular a temperature of an element or component of the converter, in particular of the inductance.

By means of the control module the selection of the current parameter set can thus be oriented to, or made dependent upon, the parameters that are critical to determining the properties of the converter.

In a preferred embodiment the regulator has an inner partial regulator for the current value and an outer partial regulator for a voltage value of the DC output voltage. The parameter set of the inner partial regulator is interchangeable.

The regulator therefore has an outer control loop (with the outer partial regulator) and an inner loop contained therein (with the inner partial regulator) inside the outer control loop.

The interchangeable parameter set is the parameter set of the inner partial regulator or the inner control loop. This embodiment corresponds to a widespread control structure for DC-DC converters. The invention is therefore suitable for this widespread converter design.

The invention is therefore also particularly effective at the most critical point of a DC-DC converter, namely the current regulation, since the current flowing through the coil at a given time depends on its inductance, if this varies strongly with current (noticeably, with associated quality losses). In this embodiment, the invention intervenes precisely at this critical point, in which the current regulation can be implemented with current-dependent parameter sets.

In a preferred embodiment, the converter comprises a memory for the parameter sets. Thus, the parameter sets can be retrieved quickly as required and are immediately available in the regulator.

In a preferred alternative design of this embodiment, the memory contains a look-up table for the parameter sets. In particular, in this case a respective parameter set is assigned to each characteristic value, for example each current value, or any combination of characteristic values (in the case of multiple parameters). After determining the relevant characteristic value (values), all that is required is for the assigned parameter set to be quickly and simply extracted from the look-up table and fed to the regulator or activated there. This ensures a particularly fast and simple exchange of the parameter sets in the converter.

In a preferred embodiment the converter is a boost converter. Boost converters are particularly affected by the problem of current-dependent inductance values of their coils, so that the invention is particularly effective here.

In a preferred embodiment the converter is a CCM converter (continuous current mode) or a DCM converter (discontinuous current mode). In a further preferred embodiment the converter is designed as a PFC circuit. The objective of a PFC circuit (Power Factor Correction) is to optimize the harmonics, the spectrum of which is evaluated via the power factor, in such a way that in addition to the fundamental (the current at 50 Hz), only a small number of harmonics are included.

The power factor therefore describes the ratio of active power to apparent power consumed. These converter types are commonly used converters, which means the invention offers advantages over a wide technical area.

In a preferred embodiment the regulator is a digital regulator. A digital regulator in this sense outputs its regulation result only at certain times, in order to use or make this usable in the converter. In the time interval until the next relevant time point, no modified regulator intervention takes place in the converter. Such digital regulators are widely used in converters, so that the invention offers advantages for a majority of converters.

In a preferred variant of this embodiment the activated parameter set in the regulator remains unchanged during a digital control cycle of the regulator. In the corresponding control cycle, the regulator performs specific internal calculations depending on input values in order to then provide its regulation result at the output. This ensures that during the internal processing in the regulator no parameters change in the regulator which could lead to unpredictable regulation results, thus avoiding this problem. The regulation and hence the converter thus become more stable.

The invention is based on the following findings, observations or considerations and has the following further embodiments. The embodiments of the invention are sometimes also referred to simplistically as "the invention". The embodiments can also contain parts or combinations of the above embodiments, or correspond to these and/or, where appropriate, also include embodiments not previously mentioned.

A fundamental design criterion for the parameters of the regulation system in a converter is the inductance used (inductive component). Depending on the type of material used, the inductance value can sometimes be strongly dependent on the current. In this case, the inductance value of the worst operating case is used for dimensioning the regulator, which usually goes hand-in-hand with compromises in the regulation behavior. In this case, it is necessary to consider whether these limitations are acceptable or whether a larger and thus more expensive coil (inductive element) with a lower current-dependent inductance drop must be used (reduction in inductance value). For example, in the case of a choke with soft-saturating core material, the inductance value in a dimensioned current range for the highest currents drops to one third of its original value at the lowest current values. This process is reversible. As soon as the current flow comes to a halt the original inductance value is reached again.

An idea of the invention therefore is to define, in a regulation system for a converter (in particular a boost converter), a plurality of control parameter sets for the strongly inductance-dependent current control loop, which take into account the inductance drop at different currents through the inductance (in particular choke currents). A logic (control module) then decides which parameter set is to be used for the regulation, depending on the instantaneously flowing (choke) current. The result is a converter, for example a boost converter, which shows optimum regulation behavior in each load case. The same result would only have been achievable if the inductance (choke) had a lower inductance drop over a larger range, but this can only be implemented by larger dimensioning and thus higher costs.

The invention is based on the consideration that different types of regulator structures exist. The type most commonly used for the DC-DC converter is the type 2 regulator, which is essentially identical to a PI regulator, but which provides the facility to influence the phase curve of the regulated system at a freely definable frequency in a targeted manner, in order to be able to optimally regulate the system. In the image area this regulator has the transfer function:

$$H(s) = \frac{B_0 + B_1 s + B_2 s^2}{1 - A_1 s + A_2 s^2}$$

This function can be converted using a z-transformation into a microprocessor computable algorithm. This results in:

$$U_{[n]} = A_1 U_{[n-1]} + A_2 U_{[n-2]} + B_0 E_{[n-1]} + B_2 E_{[n-2]}$$

Here U denotes an output value of the regulator and E an input value (the control error between target value and actual value). The parameter n denotes the measurement time, where [n] represents the value of the current measurement/calculation, [n−1] from the last function call, etc.

The parameters Ax and Bx describe the dynamic behavior and are determined by computation. They are chosen in such a way that the regulator optimally compensates the poles and zeros of the system transfer function that are typical of the topology. Depending on the converter topology and regulation method, different calculation rules are obtained for these parameters and their derivation will therefore not be discussed further here.

The control parameters Bx of the current regulator of an Average Current Mode CCM Boost Converter depend directly on the inductance of the system. For an implementation of the invention described here, this means that the parameters B0 to B2 are adjusted during the run-time of the regulator, wherein particular care should be taken to ensure that the parameters can only be changed before or after the calculation of the control algorithm. If the change takes place during the regulator calculation, this can lead to unspecified regulator responses or even to oscillation of the regulator.

In accordance with the invention the parameters can also be made to depend on other parameters (input voltage, output voltage, temperature). The number of parameter sets is not limited, for example, one possibility is a lookup table, which assigns a parameter set to each current value. The invention is not restricted to the boost converter. It can be adapted to any other converter, that is to say, to all DC-DC converters with inductance and capacitance. The invention is not limited to CCM converters and can also be adapted for converters in DCM operation.

If this type of control is used in the power supply of an audio amplifier in a boost PFC (Power Factor Correction) to compensate for the inductance drop of the choke, then it is possible to regulate the choke current and thus the mains current over the entire operating range in an optimum manner and at the same time to achieve the best possible power factor at every operating point.

At the same time, this makes it possible to avoid the use of a new larger choke, which would lead to higher manufacturing costs.

In accordance with the invention this results in a compensation of the current-dependent inductance drop in wound products in switching applications using dynamic regulation adjustment.

BRIEF DESCRIPTION OF THE DRAWINGS

Other features, effects and advantages of the invention are derived from the following description of a preferred exemplary embodiment of the invention and from the accompanying figures. Shown is, in a schematic diagram:

FIG. 1 a converter according to the invention.

DETAILED DESCRIPTION

FIG. 1 shows a converter 2 in the form of a CCM average current mode boost converter with current-dependent control parameters for current regulation for a dynamic control parameter adjustment.

The converter 2 is used to convert a DC input voltage UE into a DC output voltage UA. The converter 2 contains an inductance 4 and a capacitance 6, which are interconnected in a power-conducting path 8. A current inductance value La of the inductance 4 is dependent on a current value Ia of a current 10 (indicated by an arrow) flowing through the inductance 4.

The converter 2 contains a regulator 12 for regulating the current voltage value of the output voltage UA to a target value UAS. The regulator 12 contains a set of parameters 14a which currently determines its regulation behavior. The parameter set 14a is therefore currently activated in the regulator 12.

The converter 2 contains a measurement module 16 for determining at least one characteristic value K of at least one characteristic parameter of the converter 2. In the example the characteristic parameter is the current 10, the characteristic value K is the current value of the current Ia. The measurement module 16 is therefore a current meter. Alternatively or additionally, in other embodiments the characteristic parameter is the input voltage UE, the output voltage UA or a temperature T of the inductance 4 or any other object.

Overall, the converter 2 contains a plurality of parameter sets 14a-c for the regulator 12. The parameter sets 14b or 14c can also be activated in the regulator 12. The currently activated set then determines the current regulation behavior. The other two respective parameter sets are then not activated. The (activated) parameter sets 14a-c are thus interchangeable in the regulator 12.

In the example the parameter set 14a is activated first. The regulator 12 is therefore operating on the basis of parameter set 14a. The parameter sets 14b and 14c currently have no influence on the regulation behavior.

The converter 2 contains a control module 20. This serves both to exchange and to activate each of the parameter sets 14a to c in the regulator 12. The exchange and activation is accomplished by the control module 20 depending on at least one of the characteristic parameters, wherein in the example only one characteristic parameter is present. In the example its characteristic value K is a current value (current values Ia) of the characteristic parameter and is thus determined and/or valid at the same time as the current inductance values La. In an alternative example a second characteristic parameter exists, in the form of the DC input voltage UE. The corresponding additional characteristic value K is then the current voltage value of the input voltage UE. Therefore, two different characteristic values K exist in the converter 2, which are both fed to the control module 20 and are used by this to select the parameter sets 14a to c.

The regulator 12 has an inner partial regulator 22 (part of an inner control loop) and an outer partial regulator 24 (part of an outer control loop). The inner control loop or the partial regulator 22 regulates the current value Ia (here fed to the inner partial regulator 22 in the form of the characteristic value K) to a target value IS. The outer control loop or the partial regulator 24 finally regulates the DC output voltage UA based on its current voltage value, the actual value UAI, to its target value UAS. Only the parameter sets 14a-c of the inner partial regulator 22 are interchangeable. The outer partial regulator 24 thus operates with a fixed parameter set.

The converter 2 has a memory 26 for the parameter sets 14a-c, wherein the memory 26 either contains a look-up table for the parameter sets 14a-c or is implemented as such. In the example, therefore, the characteristic value K in the form of the current value Ia is compared with each value range 28a-c, and if the value of K is within the particular value range 28a-c, the relevant parameter set 14a or 14b or 14c is activated and used for the regulation of the regulator 12.

In the example the regulator 12 is a digital regulator. The characteristic values K and the DC output voltage UA are therefore supplied via analog/digital converters 30. (A/D converters). From currently sampled values UA[n] and K[n] and corresponding values from the previous sampling intervals [n−1] and [n−2], not described further, stored in the regulator 12, a current regulator result in the form of a duty cycle PWM for a pulse width modulation, thus a value PWM[n], is output by a PWM stage 32 as the current regulation result. In the process, the duty cycles PWM[n−1] and PWM[n−2] output at the previous sampling times [n−1] and [n−2] are also taken into account in the regulator 12. The duty cycle PWM operates a switch 34 in the converter 2, as is generally the case in standard transformers, which is therefore not further explained here.

The time interval between the output of a duty cycle PWM[n] and the input of the corresponding values UA[n] and K[n] is called the control cycle Z and is represented symbolically in FIG. 1 by an arrow. During the period of a control cycle Z the corresponding parameter set 14a, b, or c remains constantly active in the regulator 12, which means the entire control algorithm is executed according to one of the parameter sets 14a to c. Only after the completion of the control cycle Z and before the start of a new control cycle Z, that is to say, before the start of the evaluation of the output voltage UA and the characteristic parameter K in the regulator 12, if necessary —depending on the decision of the control unit 20—another of the parameter sets 14a-c can be activated.

The invention claimed is:

1. A converter (2) for converting a DC input voltage (UE) into a DC output voltage (UA), the converter (2) comprising
    at least one inductance (4) in a power-conducting path (8), wherein a current inductance value (Ia) of the inductance (4) depends on a current value (Ia) of a current (10) flowing through the coil, and
    a regulator (12) for regulating the DC output voltage (UA) to a setpoint (UAS), wherein the regulator (12) operates using an active parameter set (14a-c) that defines a dynamic behavior of the regulator,
    wherein the converter (2) comprises a measurement module (16) for determining at least one characteristic value (K) of at least one characteristic parameter of the converter (2),
    wherein the converter (2) includes a plurality of interchangeable parameter sets (14a-c) for the regulator (2), wherein each of the interchangeable parameter sets define a different dynamic behavior of the regulator and wherein each one of the parameter sets (14a-c) can be activated to become the active parameter set (14a-c), and
    wherein the converter (2) comprises a control module (20) for exchanging and activating each of the parameter sets (14a-c) in the regulator (2) as a function of at least one of the characteristic values (K).

2. The converter (2) according to claim 1, characterized in that the characteristic value (K) is a current value of the characteristic parameter.

3. The converter (2) according to claim 1, characterized in that the characteristic parameter is the current (10) and/or the DC input voltage (UE) and/or the DC output voltage (UA) and/or a temperature (T).

4. The converter (2) according to claim 1, characterized in that the regulator (2) comprises an inner partial regulator (22) for the current value (Ia), and an outer partial regulator (24) for a voltage value (UAI) of the DC output voltage (UA), and the parameter set (14a-c) of the inner partial regulator (22) is interchangeable.

5. The converter (2) according to claim 1, further comprising a memory (26) for the parameter sets (14a-c).

6. The converter (2) according to claim 5, characterized in that the memory (26) comprises a look-up table for the parameter sets (14a-c).

7. The converter (2) according to claim 1, characterized in that the converter (2) is a boost converter.

8. The converter (2) according to claim 1, characterized in that the converter (2) is a CCM-converter or a DCM-converter.

9. The converter (2) according to claim 1, characterized in that the regulator (12) is a digital regulator (12).

10. The converter (2) according to claim 9, characterized in that the activated parameter set (14a-c) in the regulator (2) is unchanged during a digital control cycle (Z) of the regulator (2).

11. The converter (2) according to claim 1, further comprising at least one capacitance (6) interconnected in a power-conducting path (8) with the at least one inductance (4).

* * * * *